United States Patent [19]

Howanski et al.

[11] Patent Number: 5,639,188

[45] Date of Patent: Jun. 17, 1997

[54] CLEAN AIR BULK MATERIAL HANDLING SYSTEM

[75] Inventors: John W. Howanski, Windham; Clifford B. Richardson, Mont Vernon, both of N.H.

[73] Assignee: Conductron Corporation, Milford, N.H.

[21] Appl. No.: 662,074

[22] Filed: Jun. 12, 1996

Related U.S. Application Data

[63] Continuation-in-part of Ser. No. 274,285, Jul. 13, 1994, abandoned.

[51] Int. Cl.[6] .................................................. B65G 53/26
[52] U.S. Cl. .................................................. 406/151; 454/228
[58] Field of Search .......................... 406/38, 39, 41, 406/121, 151, 152, 153; 454/187, 228, 236

[56] References Cited

U.S. PATENT DOCUMENTS

| | | | |
|---|---|---|---|
| 4,668,131 | 5/1987 | Hart, Sr. et al. | 406/23 |
| 4,884,923 | 12/1989 | Wellink | 406/41 |
| 4,993,883 | 2/1991 | Jones | 406/39 |
| 5,035,543 | 7/1991 | Medemblik et al. | 406/39 |
| 5,199,826 | 4/1993 | Lawrence | 406/41 |
| 5,331,991 | 7/1994 | Nilsson | 454/236 X |

*Primary Examiner*—Andrew C. Pike
*Attorney, Agent, or Firm*—David Teschner, Esq.

[57] ABSTRACT

In order to decrease or eliminate environmental contaminants which are added to fluent particulate matter removed from bulk material carriers by vacuum conveyor systems, the bulk material carrier is moved into an enclosure which can be closed off from the environment after the carrier is within the enclosure. Clean air containing a prescribed maximum number of particles above a given size floods the entire enclosure and air of even greater cleanliness is fed to each hatch of the material carrier to entrain the particulate matter in the clean air streams which pass though the bulk material under the influence of the vacuum conveyor.

20 Claims, 5 Drawing Sheets

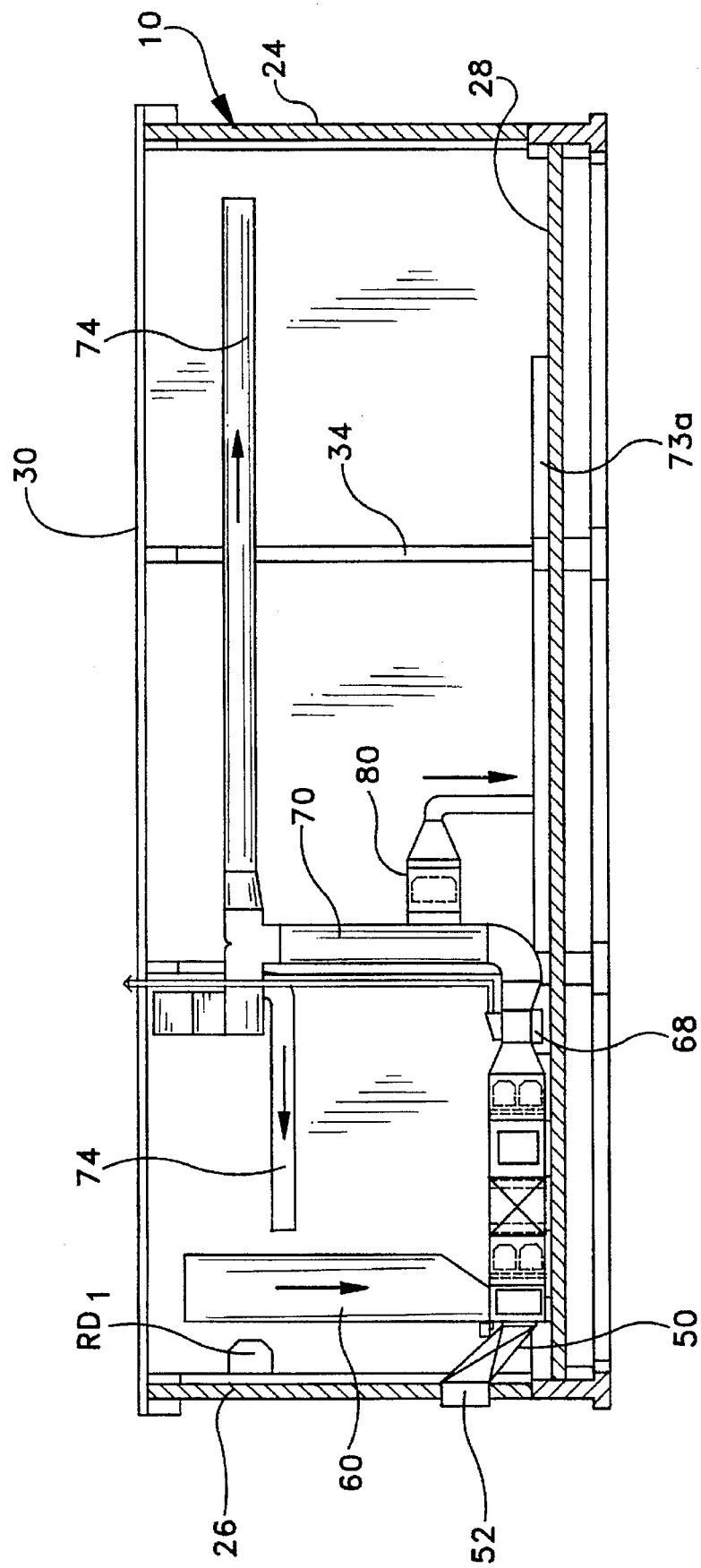

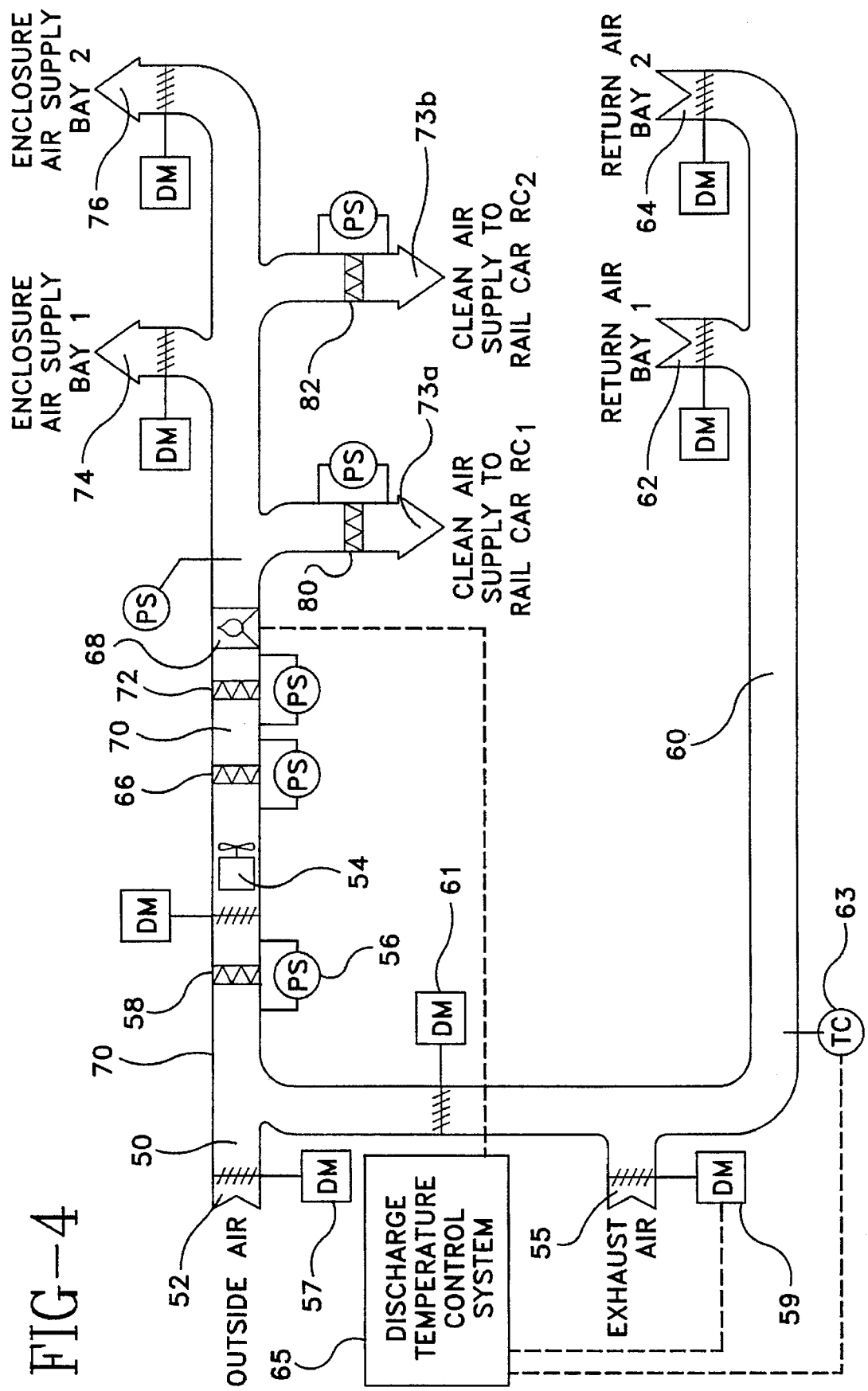

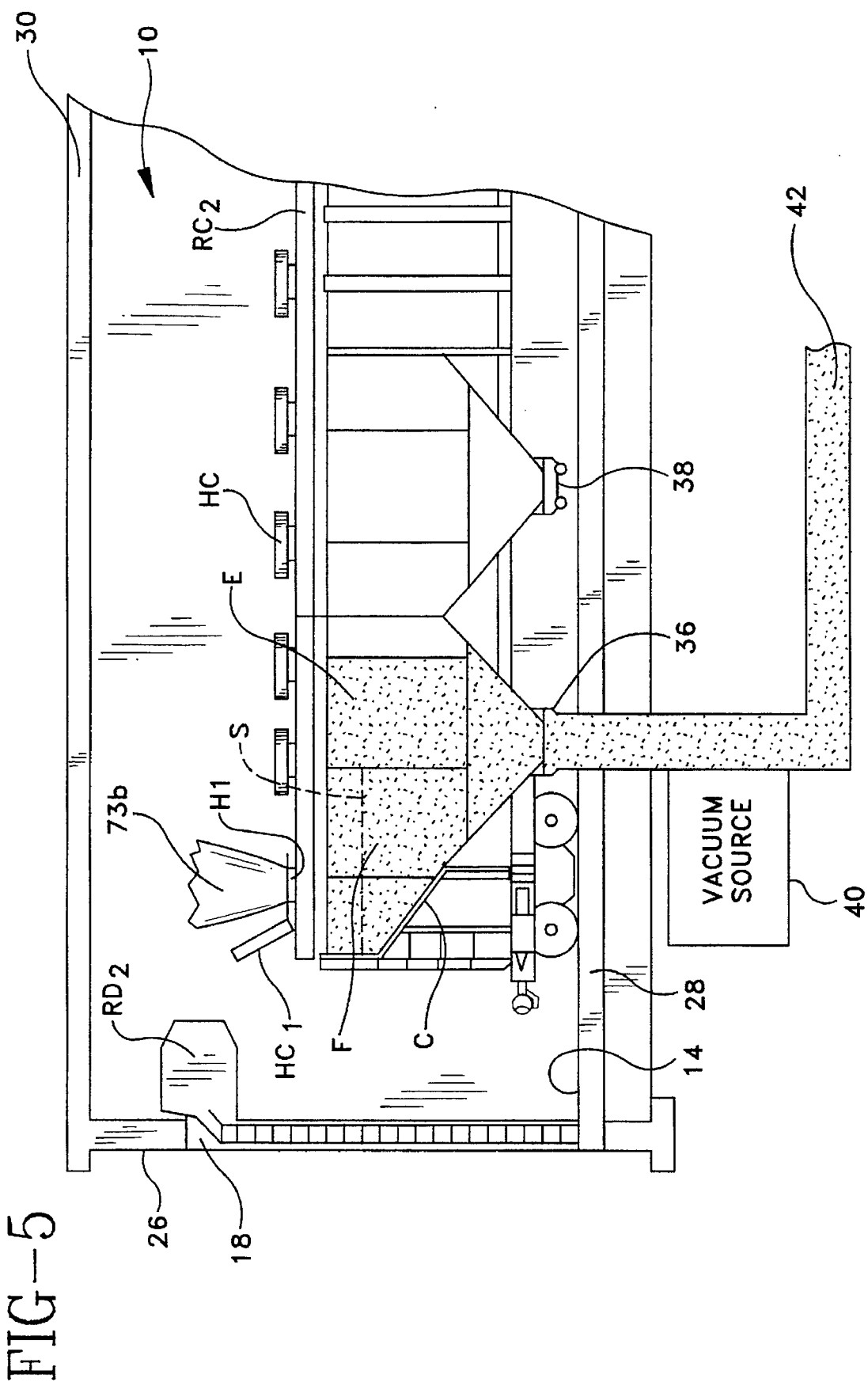

CLEAN AIR BULK MATERIAL HANDLING SYSTEM

RELATED APPLICATION

This is a continuation-in-part of U.S. patent application Ser. No. 08/274,285 filed Jul. 13, 1994, and now abandoned.

BACKGROUND OF THE INVENTION

1. Field of the Invention

The invention is directed to the movement of granular or fluent particulate matter from a shipping container to a point of use and more particularly to a clean air, vacuum operated bulk material handling system.

2. Description of the Prior Art

At present when it is desired to use a vacuum system unload a rail car or tank truck containing granular materials such as grain, corn kernels, beans, plastic pellets, or fluent particulate matter such as molding powders, carbon or lamp black, or coloring agents, the loading and discharge hatches of the rail car are opened to the surrounding environment and air is drawn into the rail car to entrain the granules or particles in the moving air stream. Unfortunately, since the fall car or tank truck is exposed to ambient environment, and often in a very industrial area, the air and grounds about the rail car or tank truck are highly contaminated and these contaminants can be drawn into the air stream as well as the granules and particulate matter and carried to the using station. These contaminants could alter the properties of the products being made at the using station. For example, if rubber is being molded, such contaminants could alter the physical or electrical properties of the resultant molded rubber product which could lead to its failure in the field.

SUMMARY OF THE INVENTION

The instant invention seeks to overcome the deficiencies noted with respect to the prior art by providing a clean air bulk material handling system which substantially reduces the introduction of any foreign matter and contaminants from the outside air into the air stream carrying the granular or particulate matter being unloaded from bulk carriers such as rail cars and tank trucks. This is accomplished by providing an enclosure for the bulk carrier which is extremely clean and which substantially reduces the contaminants entering such enclosure. The enclosure is supplied with outside air which has been filtered and heated and which is also extremely clean. Thus when the entraining of the granules or particles with the ambient air occurs, substantially no contaminants are added to the granules or particulate matter. It is an object of the instant invention to provide an improved bulk handling system for granular or particulate matter.

It is another object of the instant invention to provide an improved vacuum operated bulk handling system for granular or particulate matter.

It is another object of the instant invention to provide an improved bulk handling system for granular or particulate matter which prevents or minimizes the introduction of foreign or contaminant matter from outside of the system.

It is yet another object of the instant invention to provide an improved vacuum operated bulk handling system for granular or particulate matter which prevents or minimizes the introduction of foreign or contaminant matter from outside of the system.

It is still another object of the instant invention to provide an improved vacuum operated bulk handling system for granular or particulate matter which employs a contaminant-free enclosure for the bulk material carrying device and supply for entraining the granules and particulate matter in the system air stream.

Other objects and features of the invention will be pointed out in the following description and claims and illustrated in the accompanying drawings, which disclose, by way of example, the principles of the invention, and the best mode which is presently contemplated for carrying it out.

BRIEF DESCRIPTION OF THE DRAWINGS

In the drawings in which similar elements are given similar reference characters:

FIG. 3 is a front elevational view of the building of FIG. 1 with the wall removed to reveal the details of the structures within.

FIG. 4 is a schematic representation of the duct work of FIGS 1 to 3 to show the manner of supplying required air and removing spent air.

FIG. 5 is a fragmentary front elevational view of the building of FIG. 1 with the wall removed, a railway car in position and engaged by devices of the system and a roll-up door closed.

DESCRIPTION OF THE PREFERRED EMBODIMENT

Figure 1:
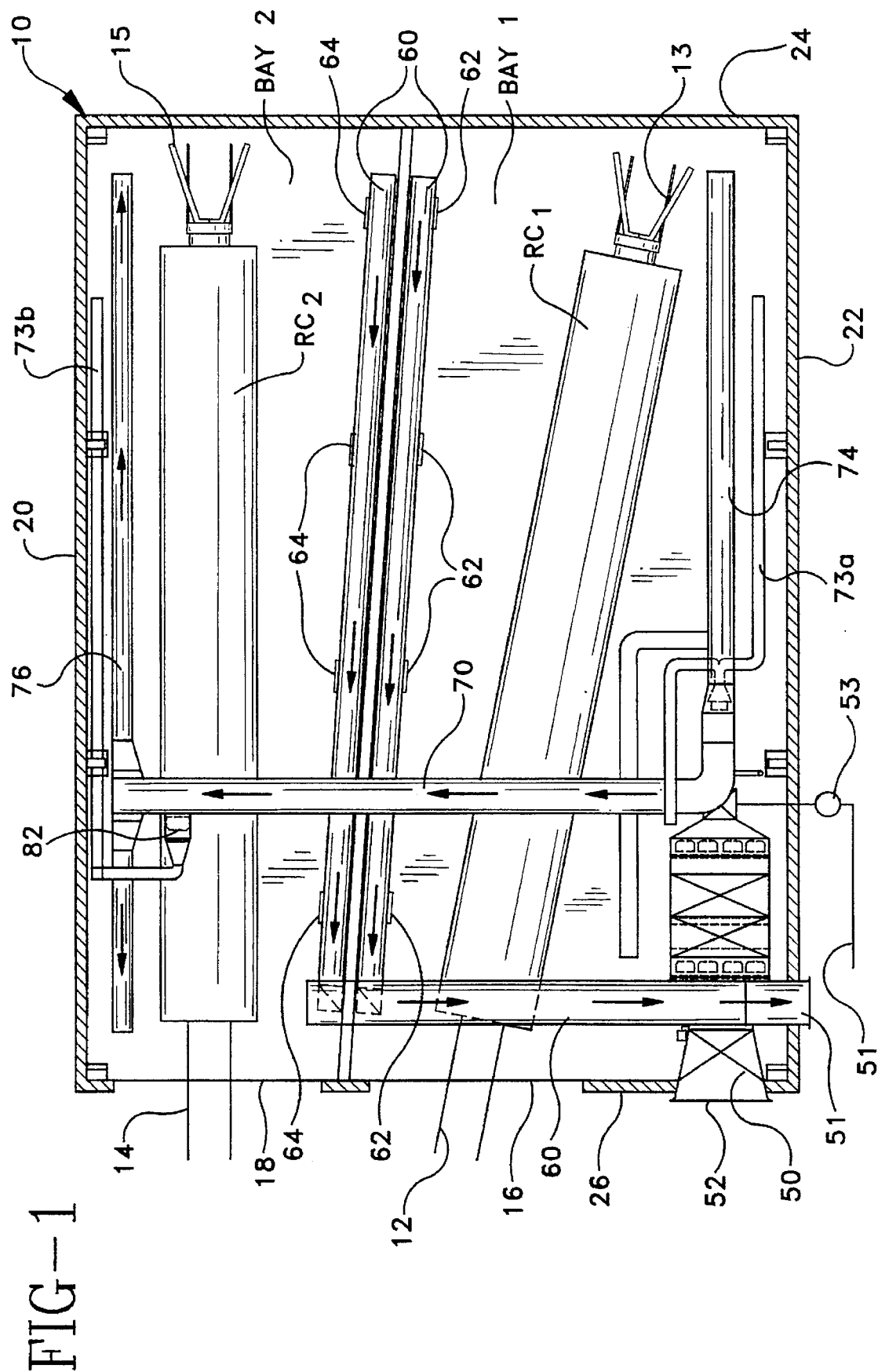
FIG. 1 is a top elevational view of a building constructed to facilitate practice of the method of the instant invention with the roof removed to reveal the details of the structures within.

Turning to FIGS 1 to 3 and 5 there is shown a building or enclosure 10 which can be used to enclose two railway cars $RC_1$ and $RC_2$ which contain granular or fluent particulate matter to be off-loaded by a vacuum conveyor system. To simplify the description, the term fluent matter will be used herein to refer to both granular and fluent particulate matter. It should be understood that although the description herein is made with reference to rail cars, the invention is equally applicable to tank trucks or other vehicles used to carry fluent matter and the building or enclosure employed would be a garage with similar features but without the rails or a building or enclosure which can handle both rail cars and tank trucks.

Building 10 is divided into two bays with a set of tracks 12 extending from a main track line (not shown) into Bay 1 to permit railway car $RC_1$ to be moved fully within enclosure 10 up to the end barrier or bumper 13. A second set of tracks 14 extending from the same main track line permits a railway car $RC_2$ to be moved fully into Bay 2 of the enclosure 10, up to the barrier or bumper 15. A set of roll-up doors $RD_1$ shown in FIG. 3 and $RD_2$ shown in FIG. 5 can now be moved from their open positions to close entrance 16 to Bay 1 and entrance 18 to Bay 2 as shown on FIG. 5. If desired to remove any environmental contaminants from the outside of the railway cars $RC_1$, $RC_2$, a car washing system (not shown) similar to a car wash could be employed before the railway cars $RC_1$ and $RC_2$ are moved into enclosure 10 or while in enclosure 10.

Figure 2:
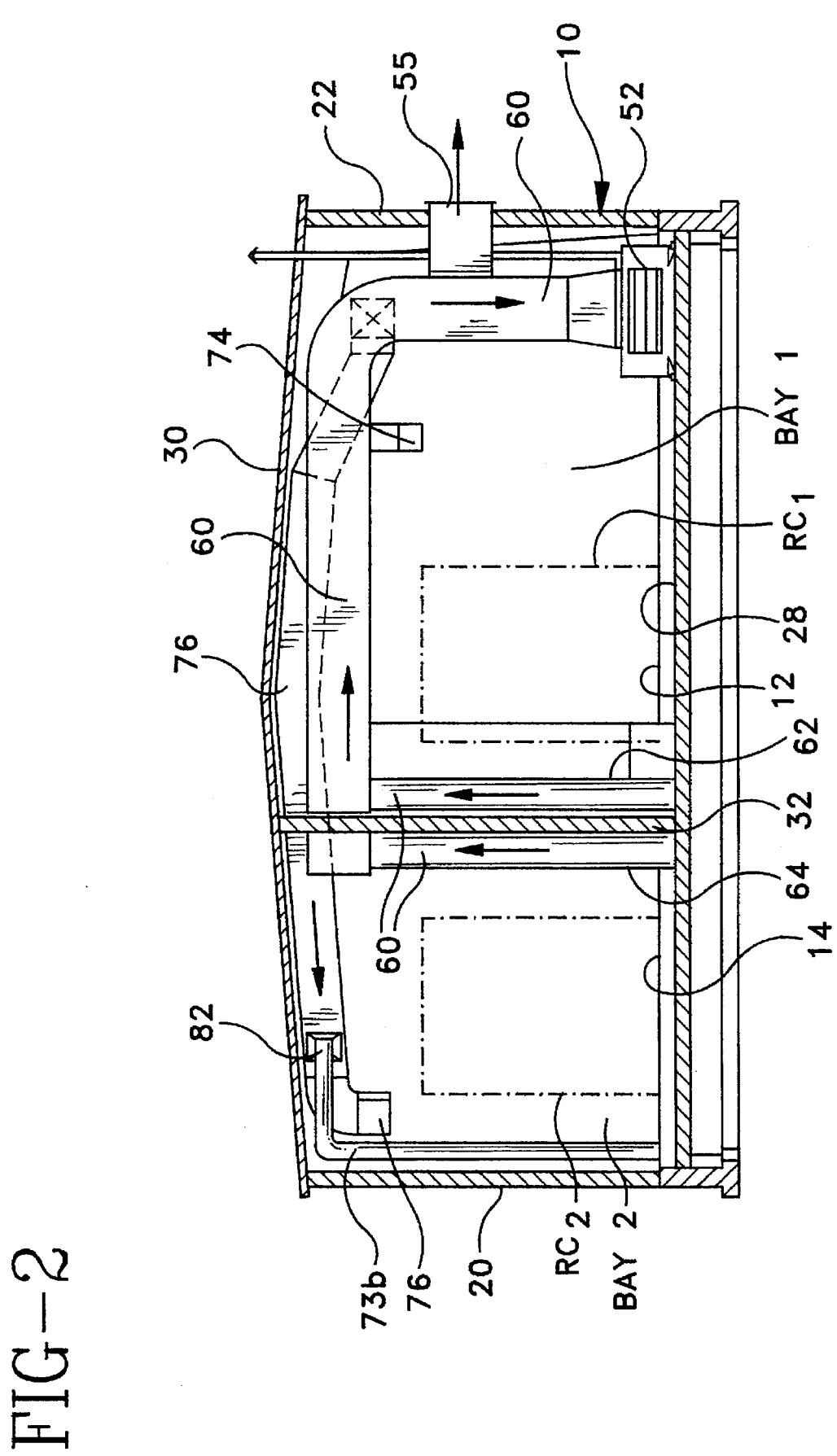
FIG. 2 is a left end elevational view of the building of FIG. 1 with the walls and doors thereof removed to reveal the details of the structures within.

Building 10 has two substantially parallel walls, front wall 22 and rear wall 20, and two substantially parallel end walls, a left end wall 26 and a right end wall 24 when building 10 is viewed as it appears in FIG. 1. Left end wall 26 has, as stated above, two entrances 16 and 18 which are fitted with roll-up doors $RD_1$ and $RD_2$, respectively, to close entrances 16 and 18. The floor 28 is raised as shown in FIGS. 2 and 3 but could also be placed directly upon the ground. Tracks 12 and 14 are contained in floor 28. Two roof support columns 32, 34 extend from floor 28 to the roof 30. Although roof 30 is shown as a centrally peaked roof, it could also be flat or inclined from one end to the other dependant upon local weather conditions.

FIG. 5 shows railway car $RC_2$ in building 10 with the roll-up door $RD_2$ in the closed position to close entrance 18 to Bay 2. A first hatch cover $HC_1$ is shown in the open position while the remaining hatch covers HC are shown in the closed position. The end of duct 73b is moved into position in the open hatch $H_1$ to supply clean air. As a result of the application of air to the fluent matter F in the railway car compartment C and the effects of the vacuum system drawing matter from railway car $RC_2$, the fluent matter F at or near the surface S of the fluent matter is lifted and entrained in the air stream forming a cloud-like formation E which is drawn by the vacuum source 40 through collection fitting 36 attached to the bottom discharge hopper 38 of the railway car $RC_2$ and available at output pipe 42.

Turning to FIG. 4 the concept of the instant invention can be described. As stated above, the concept broadly stated is to provide fluent matter, which has substantially no on-site environmental contaminants, from a bulk material carrier to a vacuum conveyor system, wherein the bulk carrier is moved entirely into an enclosure which is then sealed with respect to the environment about the enclosure. Clean outside air, from which substantially all of the environmental contaminants have been removed, is provided to fill the bays of the enclosure about the carriers and still cleaner air, from which substantially all of any remaining environmental contaminants present in the clean air in the enclosure are removed, is provided to the carrier interior to provide a clean air stream to entrain the fluent matter and permit the fluent matter to be drawn into the vacuum conveyor.

Fresh outside air is drawn into the system at the entrance 52 to duct 50 by a blower 54. The fresh outside air is combined with the recirculated return air in duct 60 from registers 62 in Bay 1 and registers 64 in Bay 2. The amount of outside air which enters duct 50 is controlled by the motorized air damper 57 adjacent entrance 52 and the amount of recirculated return air which enters duct 50 is controlled by the relative settings of the motorized air damper 59 in the exhaust air duct 55. The motorized dampers, show by a rectangle enclosing the letters DM and coupled to a member with short diagonal lines, such as 57, 59, and 61, as well as the other motorized dampers shown, are coupled to and controlled by a computer system (not shown) which, among its other tasks yet to be described, controls the entire ventilation system and provides static pressure control employing a number pressure drop indicators, shown by the circles enclosing the letters PS and connected across medium efficiency filter 58 and supplies and input to the computer system as do all of the other pressure drop indicators shown. Using the various pressure drop indicator signals and other pressure indicators the computer can control the air stream flow to insure proper air flow. Temperature sensors, such as 63 connected to the return air duct 60, and shown by the circle enclosing the letters TC, sense the temperature of the return air and supply signals to the discharge temperature control system 65, shown in dashed lines, which in turn is connected to gas burner and heat exchanger section 68, as shown by the dashed lines, to control the heat applied to the air in duct 70.

The combined fresh outside air and return air is passed through a medium efficiency filter 58 to duct 70. By controlling the amount of return air in duct 60 and the fresh outside air in duct 50 it is possible to produce the desired air flow within the enclosure 10. This flow may be in the order of 10,000 cubic feet per minute for an enclosure of the size of enclosure 10. The air flow can be increased or decreased for the specific enclosure or the material being handled, or the carrier, etc.

The air in duct 70 is passed through a second medium efficiency filter 66, and then through a HEPA (High Efficiency Particulate Air) filter 72 and then through a gas burner and heat exchanger section 68. The filtered and heated air is then provided to the bay air supply ducts 74 and 76 for Bay 1 and Bay 2 respectively via duct 70. This air is class 10,000 air. Federal Standard 209 D is the accepted method for measuring the degree of cleanliness and requires an actual count of the cumulative total number of particles of a particular size (diameter) or larger per unit volume of air. For the 10,000 class air, the air sample contains a maximum of 10,000 particles of 0.5 microns (0.0000005 meters) or larger, where 0.5 microns is the customary representative size. The air is also at a temperature of 65° to 95° F. and at a pressure of 2.50" WC.

The air is supplied to the openable hatches of the railway cars via ducts 73a and 73b. The air supplied to ducts 73a and 73b is passed through HEPA filters 80 and 82. The air supplied by filters 80 and 82 is class 100 air which means that an air sample contains a maximum of 100 particles of 0.5 microns or larger. In the system described the particle size has been reduced to 0.3 microns rather than the standard 0.5 microns particle diameter permitted by the Federal Standard.

Returning now to FIGS. 1, 2, 3 and 4, the physical structure for collecting and distributing the air is shown. Fresh outside air enters entrance 52 of duct 50 and is advanced along duct 50 to where the recirculated return air duct 60 joins duct 50. The combined air is passed through duct 70 and the filters 58, 66, and 72 and on to the gas burner and heat exchanger 68 to raise the air temperature to a minimum 65° F. The gas required for the gas burner is supplied via gas line 51 through regulator 53. Part of the air which exits duct 70 is directed to duct 74 along the top of wall 22 which provides the air supply for Bay 1. Another portion of the air from duct 70 goes to duct 76 adjacent the top of wall 20 to provide the air supply for Bay 2.

The remainder of the air in duct 70 is divided between two additional ducts 73a and 73b. In passing from ducts 70 and 76 to each of the further ducts 73a and 73b the air goes through HEPA filters 80 and 82 respectively. The air in duct 73a is released next to the railway car $RC_1$ through a number of vent ports. Similarly, the air in duct 73b is released next to the railway car $RC_2$ through a number of vent ports. The vent ports should be aligned with the hatches available in each railway car and whose hatch covers are open and those not used may be suitably closed by their respective hatch covers to maintain 1.0" WC of pressure in the system.

The air not employed in the air stream of the vacuum conveyor is removed by the ducts 60 near the floor 28 of enclosure 10 through registers 64 in Bay 2 and 62 in Bay 1 to be used as recirculated return air as above described. Excess air is exhausted via vent 55 in side wall 22 and building 10 is maintained at 0.1" WC.

While there have been shown and described and pointed out the fundamental novel features of the invention as applied to the preferred embodiment, it will be understood that various omissions and substitutions and changes of the form, and details of the devices illustrated and in their operation may be made by those skilled in the art, without departing from the spirit of the invention.

We claim:

1. A method of minimizing environmental contamination of bulk quantities of fluent materials off-loaded from at least one bulk material carrier from environmental contaminants present outside of said at least one bulk material carrier employing a vacuum system, the method comprising the steps of:
   a) placing said at least one bulk material carrier containing the fluent materials in an enclosure having an exterior and an interior;
   b) supplying clean air to said interior of said enclosure;
   c) entraining the fluent materials in said at least one bulk material carrier in an air stream as said clean air is applied to the fluent materials; and
   d) drawing the entrained fluent materials from said at least one bulk material carrier by the vacuum system.

2. The method of claim 1, further comprising the step of closing off said enclosure to prevent entry of the environmental contaminants from an environment about the exterior of the enclosure to said interior of said enclosure after said at least one bulk material carrier has been placed in said interior of said enclosure.

3. The method of claim 1, wherein said step of supplying the clean air comprises the steps of:
   a) obtaining outside air from an environment about the exterior of said enclosure; and
   b) filtering said outside air to remove substantially all of the environmental contaminants therefrom.

4. The method of claim 3, further comprising the step of heating the filtered air to within a predetermined range of temperatures.

5. The method of claim 1, wherein said step of supplying the clean air comprises the steps of:
   a) obtaining outside air from an environment about the exterior of said enclosure; and
   b) moving said outside air through at least two series of filters, each successive said series of filters having a higher efficiency than a preceding said series of filters thereof, to remove substantially all of the environmental contaminants therefrom.

6. The method of claim 5, further comprising the step of heating the filtered air to within a predetermined range of temperatures.

7. A method of minimizing environmental contamination of bulk quantities of fluent materials off-loaded from at least one bulk material carrier from environmental contaminants present outside of said at least one bulk material carrier employing a vacuum system, the method comprising the steps of:
   a) placing said at least one bulk material carrier containing the fluent material in an enclosure having an exterior and an interior;
   b) supplying a first quantity of outside air at a first degree of cleanliness to said interior of said enclosure;
   c) supplying a second quantity of the outside air at a second degree of cleanliness, higher than said first degree of cleanliness, to said at least one bulk material carrier in said enclosure;
   d) entraining the fluent materials in said at least one bulk material carrier in an air stream as said outside air having said second degree of cleanliness is applied to the fluent materials in said bulk material carrier; and
   e) drawing the entrained fluent materials from said at least one bulk material carrier by said vacuum system.

8. The method of claim 7, further comprising the step of closing off said enclosure to prevent entry of the environmental contaminants from an environment about the exterior of said enclosure to said interior of said enclosure after said at least one bulk material carrier has been placed in said enclosure.

9. The method of claim 7, wherein the step of supplying the air at a first degree of cleanliness comprises the steps of:
   a) obtaining the outside air from an environment about the exterior of said enclosure; and
   b) filtering said outside air to remove substantially all of the environmental contaminants therefrom.

10. The method of claim 9, further comprising the step of heating the filtered air at said first degree of cleanliness to within a predetermined range of temperatures.

11. The method of claim 7, wherein the step of supplying air at said second degree of cleanliness comprises the steps of:
    a) obtaining the outside air from an environment about the exterior of said enclosure; and
    b) moving said outside air through at least two series of filters, each successive said series of filters having a higher efficiency than a preceding said series of filters thereof, to remove substantially all of the environmental contaminants therefrom.

12. The method of claim 11, further comprising the step of heating the filtered air at said second degree of cleanliness to within a predetermined range of temperatures.

13. A system for minimizing environmental contamination of bulk quantities of fluent materials off-loaded from at least one bulk material carrier containing fluent materials by environmental contaminants outside of said at least one bulk material carrier, each of said at least one bulk material carrier having at least one compartment to contain the fluent materials, at least one entry hatch for each said at least one compartment into said compartment to permit fluent materials to be placed in said at least one compartment through said at least one entry hatch, at least one moveable hatch cover, one for each of said at least one entry hatch, each of said at least one moveable hatch cover being capable of being moved between a closed position blocking the entry hatch thereof, and an open position permitting access to said entry hatch, and at least one operable exit hopper for each of said at least one compartment, said operable exit hopper capable of being operated to a closed position to prevent the fluent materials from exiting said compartment thereof and operated to an open position to permit the fluent materials to exit said compartment thereof, the off-loading employing a vacuum system comprising:
    a) an enclosure to receive said at least one bulk material carrier, said enclosure having an exterior and an interior;
    b) a supply of clean air, said supply of clean air adapted to be introduced into said at least one compartment of said at least one bulk material carrier through the entry hatch thereof when the moveable hatch cover thereof is in said open position and said at least one bulk material carrier is placed in said enclosure to cause said clean air to entrain the fluent materials in said at least one compartment of said at least one bulk material carrier; and
    c) means to couple said at least one operable exit hopper, operated to said open position, of said at least one compartment of said at least one bulk material carrier in said enclosure to said vacuum system whereby said entrained fluent materials in said at least one compartment of said at least one bulk material carrier is drawn out of said at least one compartment of said at least one bulk material carrier by said vacuum system.

14. The system of claim 13, wherein said enclosure is a complete structure to surround said at least one bulk material carrier and has at least one door which can be opened to admit said at least one bulk material carrier into the interior of said enclosure and closed after said at least one bulk material carrier is in position in the interior of said enclosure to seal said interior of said enclosure form the environmental contaminants about said exterior of said enclosure.

15. The system of claim 14, wherein said supply of clean air comprises:
   a) means to obtain the outside air from about the exterior of said enclosure; and
   b) means, coupled to the means to obtain outside air, to remove substantially all of the environmental contaminants from said outside air.

16. The system of claim 15, further comprising:
   means to heat said outside air from which substantially all of the environmental contaminants have been removed to within a predetermined range of temperatures.

17. The system of claim 16, wherein said means to remove substantially all of the environmental contaminants from said outside air is at least two series of filters, each successive said series of filters having a higher efficiency than a preceding said series of filters thereof.

18. The system of claim 17, wherein said filtered and heated air is provided to said interior of said enclosure and to said at least one entry hatch, the movable hatch cover thereof being in said open position, of said at least one bulk material carrier placed in said enclosure.

19. The system of claim 18, further comprising:
   a further filter wherein said filtered and heated air to be provided to said at least one entry hatch, said moveable hatch cover thereof being in the open position, is passed through said further filter before before said filtered and heated air reaches said at least one entry hatch, said movable hatch cover thereof being in the open position, of said at least one bulk material carrier placed in said enclosure.

20. The system of claim 15, further comprising:
   blower means to draw said outside air from about said exterior of said enclosure propel said outside air through said means to remove substantially all of the environmental contaminants from said outside air.

* * * * *